No. 656,389. Patented Aug. 21, 1900.
P. J. COLLINS.
MOTOR VEHICLE.
(Application filed Dec. 18, 1899.)
(No Model.) 6 Sheets—Sheet 1.

Witnesses

Inventor
Patrick J. Collins
by Watson & Watson
Attorneys

No. 656,389. Patented Aug. 21, 1900.
P. J. COLLINS.
MOTOR VEHICLE.
(Application filed Dec. 18, 1899.)
(No Model.) 6 Sheets—Sheet 4.

Witnesses
D. L. Hockaday
Arthur L. Bryant

Inventor
Patrick J. Collins
by Watson & Watson
Attorneys

No. 656,389. Patented Aug. 21, 1900.
P. J. COLLINS.
MOTOR VEHICLE.
(Application filed Dec. 18, 1899.)
(No Model.) 6 Sheets—Sheet 5.

Fig. 6.

Witnesses
Inventor
Patrick J. Collins
by Watson & Watson
Attorneys

UNITED STATES PATENT OFFICE.

PATRICK J. COLLINS, OF SCRANTON, PENNSYLVANIA, ASSIGNOR TO THE COLLINS ELECTRIC VEHICLE COMPANY, OF SAME PLACE.

MOTOR-VEHICLE.

SPECIFICATION forming part of Letters Patent No. 656,389, dated August 21, 1900.

Application filed December 18, 1899. Serial No. 740,715. (No model.)

*To all whom it may concern:*

Be it known that I, PATRICK J. COLLINS, a citizen of the United States, residing at Scranton, in the county of Lackawanna and State of Pennsylvania, have invented certain new and useful Improvements in Motor-Vehicles, of which the following is a specification.

My invention comprises certain improvements in propelling and steering devices for electrically-operated motor-vehicles, whereby I am enabled to use high-speed motors having light weight and high efficiency and to readily control the movement of the vehicle under all conditions.

In the accompanying drawings, which illustrate my invention, Fig. 3 is a perspective view of the motor-support, having the motor and worm-gears thereon.

Figure 1:
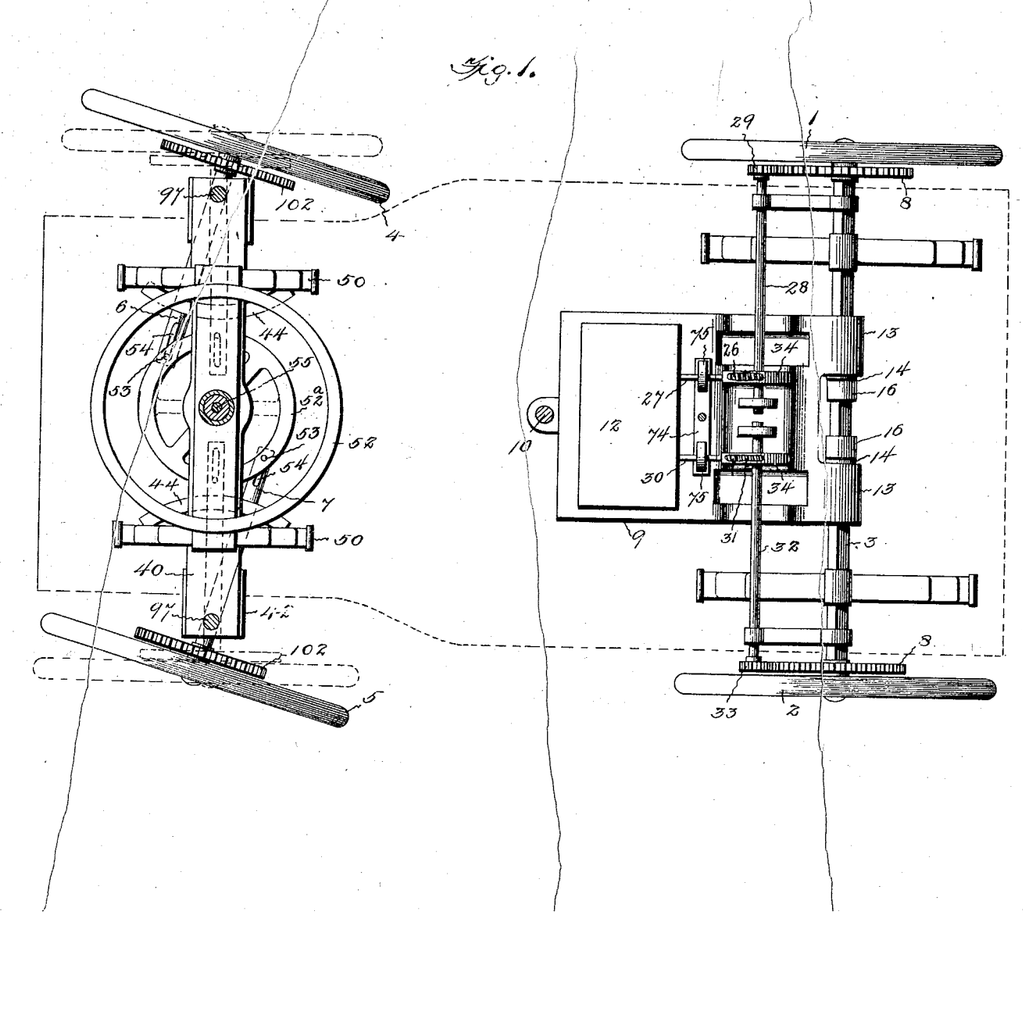
Figures 1 and 2 are plan views of the trucks, the forward truck being shown in different positions relatively to the vehicle-body, which is shown in outline.
Figure 2:
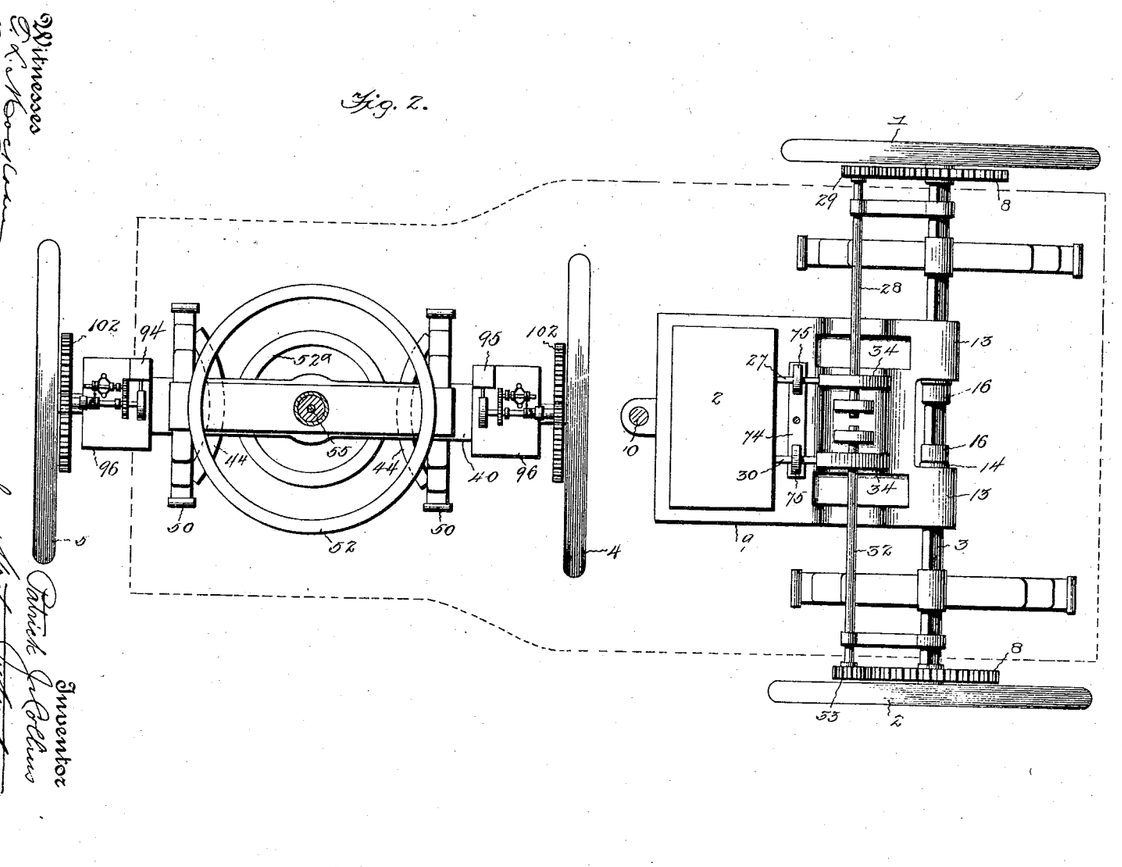
Figure 4:
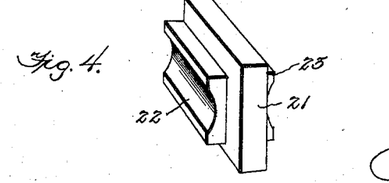
Fig. 4 is a similar view of the removable partition within the motor.

Referring to Figs. 1, 2, and 3 of the drawings, 1 and 2 indicate the rear or driving wheels, which are journaled upon the ends of a fixed axle 3, and 4 and 5 indicate the forward or steering wheels, which are journaled upon the ends of pivoted half-axles 6 and 7, respectively. Each of the rear wheels is provided with a spur-gear 8, which is fixed to its hub. Midway between the rear wheels is arranged a motor-support 9, said support being hinged to the axle at one end and having its free end supported by a post 10, depending from the body of the carriage, Fig. 6. Suitable springs 11 are arranged upon the post above and below the motor-support to cushion the latter.

As shown in Fig. 3, the ends of the arms 13 of the support are journaled upon flanged sleeves 14, having angular openings 15, which fit upon the axle. Suitable clamps or collars 16 are arranged upon the axle between said arms to keep the support and the flanged sleeves in position.

The motor 12, as shown in Fig. 3, consists of a hollow rectangular field-frame having at its opposite ends inwardly-projecting pole-pieces 17 and 18, provided with field-coils 19 and 20, respectively, and a removable partition 21, arranged midway between said pole-pieces and forming part of the magnetic circuit, said partition having on its opposite sides short pole-pieces 22 and 23, which are opposed to the pole-pieces 17 and 18. In one compartment of the motor, between the pole-pieces 17 and 22, is arranged an armature 24, and an armature 25 is similarly arranged between the pole-pieces 18 and 23 in the opposite compartment of the motor. It will be seen that with this arrangement when current is passed through the field-coils consequent poles will be set up in the short pole-pieces 22 and 23 and that the armatures may be operated and controlled independently of each other. The motor is designed to develop a high armature speed, and power is transmitted to the wheels through the medium of worm-gears. By employing high-speed armatures the necessary amount of power may be secured with a minimum weight in the motor, and as the speed is reduced through the medium of worm-gearing very little noise results from the gearing. Owing to the suspension of the motor-support the hum of the motors, as well as any noise arising from the gearing, is deadened.

As shown, power is transmitted to the wheel 1 by means of a worm-wheel 26, meshing with a worm upon the shaft 27 of the armature 25, and a shaft 28, having a pinion 29 in mesh with the gear 8 upon the wheel 1. Similarly the shaft 30 of the armature 24 is provided with a suitable worm, which engages a worm-wheel 31 upon a shaft 32, having a pinion 33, which engages gear 8 upon the wheel 2. In this manner it will be seen that the driving-wheel 1 is operated by the armature 25 and that the driving-wheel 2 is independently operated by the armature 24. As shown, the worm-wheels are inclosed in suitable casings 34, and the support 9 is formed with a step 35 above the plane of the motor-bed upon which said casings are mounted, so that the armature-shafts will be in line with the lower teeth of the worm-wheels.

Figures 5, 8:
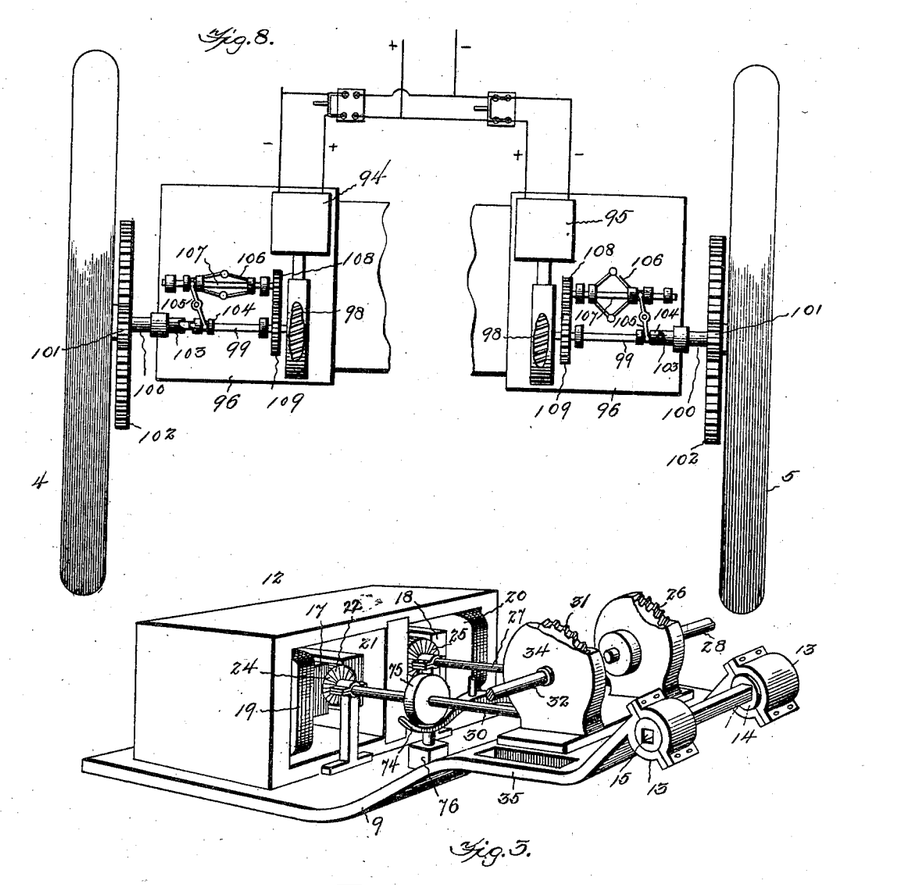
Fig. 5 is a view of the front of the vehicle, partly broken away and partly in section.
Fig. 8 is a plan view showing the automatic couplers for the auxiliary motors upon the forward truck.
Figures 5, 7, 10:
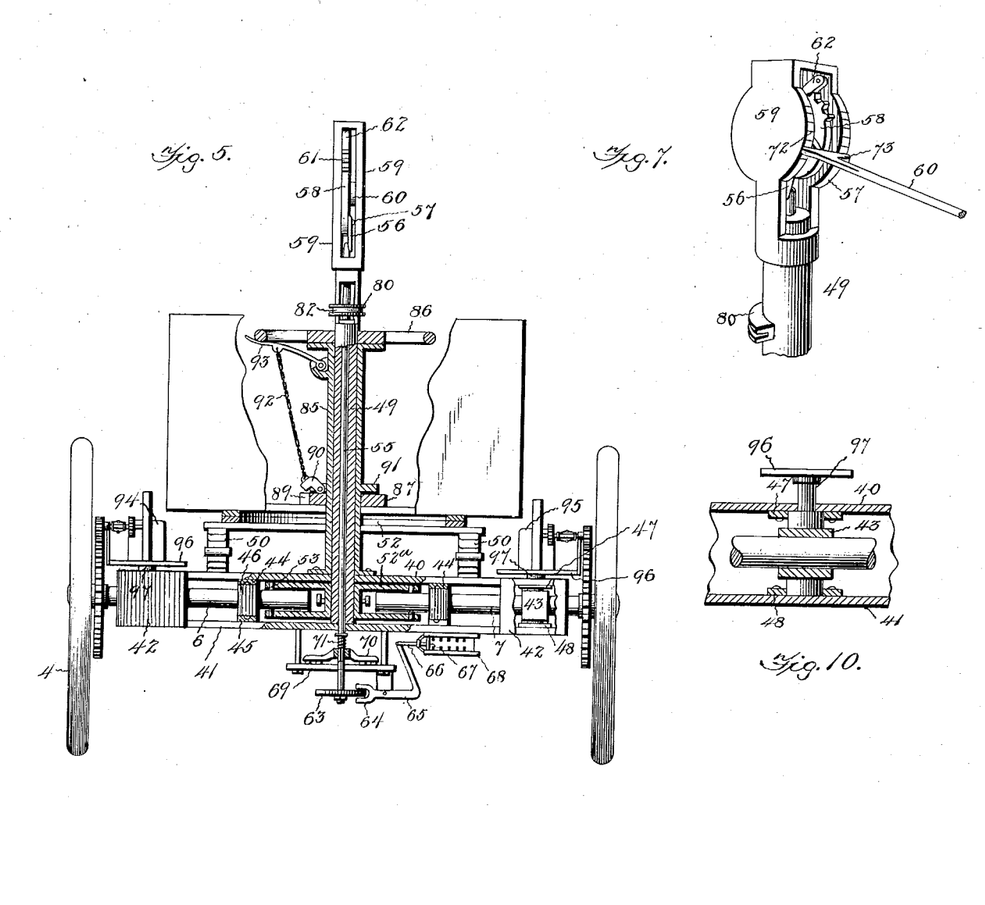
Fig. 7 is a perspective view of the head of the steering-post and lever.
Fig. 10 is a detail sectional view showing the pivotal support for one of the front axles.
Figure 6:
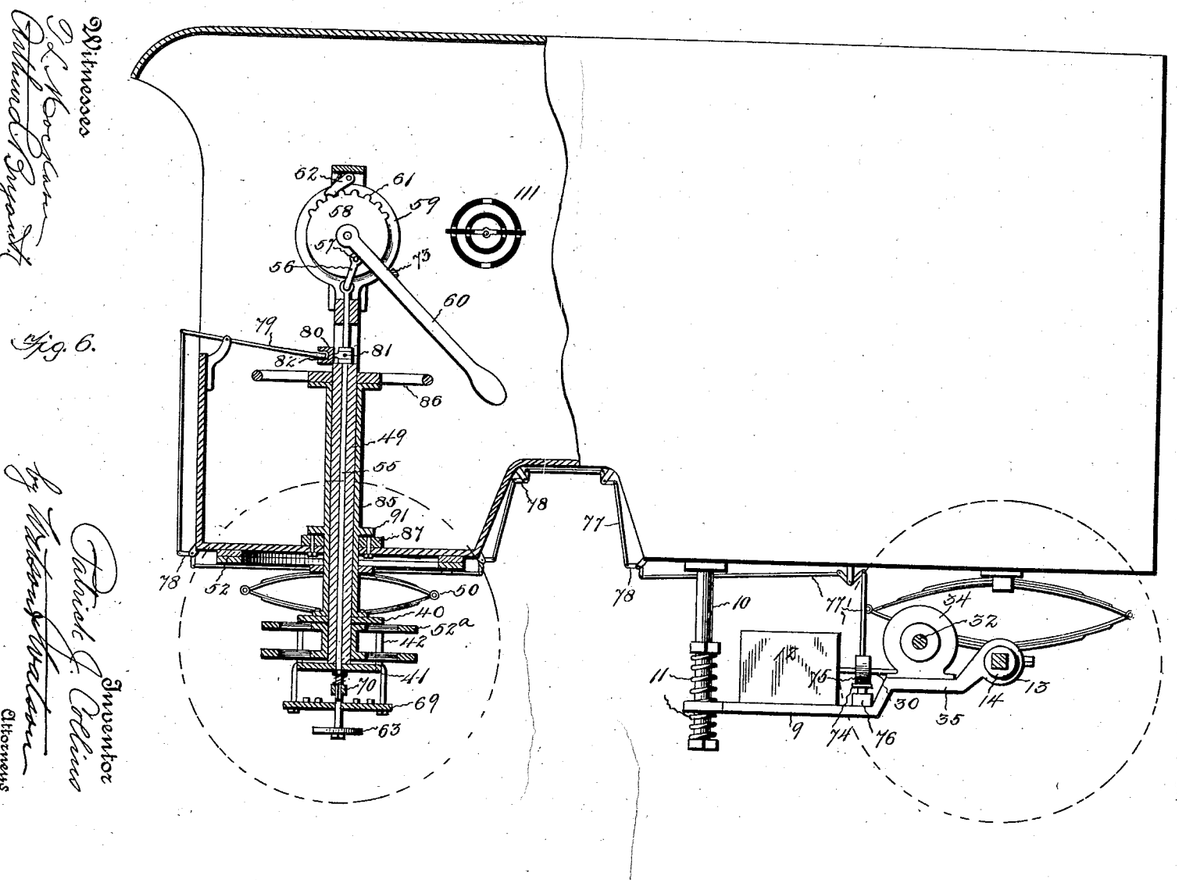
Fig. 6 is a side view of the vehicle, the forward part being shown in central section.

As shown in Figs. 5 and 6, the fore part of the carriage is supported upon an axle-casing consisting of flat top and bottom pieces 40 and 41, united at their ends by short side pieces 42, suitable springs 50 and a fifth-wheel 52 being arranged between the body and said casing. The casing is supported by the half-axles 6 and 7, which extend longitudinally therein, said axles being pivoted near the outer ends of the casing in trunnion-blocks 43, so that they may swing in horizontal planes, the inner ends of the axles being guided between upper and lower segmental guideways 44 and 45. As shown, each axle is provided with a fixed guide-block 46, between which and the guideways are arranged suitable ball-bearings. Removable bearings 47 and 48 are arranged within the interior of the casing for the trunnions upon the blocks 43. A hollow steering-post 49 extends vertically through the center of the top 40 of the casing and through the footboard of the carriage centrally of the fifth-wheel, said post having a bearing upon the bottom piece 41 of the casing. Secured to the post within the casing is a wheel 52ª, having vertical pins 53, arranged at diametrically-opposite points. The half-axles are formed with slots 54, Fig. 1, at their inner ends which extend longitudinally and vertically therethrough, and the pins 53 extend through said slots. It will be seen that when the steering-post is turned in either direction the engagement of the pins with the half-axles will throw the latter out of line with the casing in opposite directions, as indicated in full lines, Fig. 1, the wheels at all times remaining in parallel planes.

Extending centrally through the steering-post is a rod 55, which is connected at its upper end by a link 56 to a pin 57 upon a wheel 58, the latter being journaled in vertical side frames 59, which are secured to the upper end of the steering-post. The wheel 58 is provided with a handle 60, by means of which said wheel may be rotated to raise and lower the rod 55, and by means of which also the steering-post may be rotated. The wheel 58 is provided with rounded teeth 61, which are adapted to be engaged by a spring-detent 62, so that the wheel may be held in various positions. The rod 55 extends through and below the axle-casing, and at its lower end is provided with a disk 63, which engages the forked end 64 of a lever 65, whose opposite end is connected by a rod 66 to the movable contact 67 of a speed-controller 68. This controller may be of any usual form, its purpose being to control both armatures of the motors upon the rear axles, so that they may be simultaneously started, stopped, or varied in speed. It is not deemed necessary to illustrate the connections from the controller to the armatures or field-coils for the reason that this controller may be arranged and connected to govern the speed of the armatures in any of the well-known ways in which street-car motors are controlled.

Above the disk 63 and supported from the lower side of the casing 40 is a horizontally-arranged steering-switch consisting of a plate 69, having suitably-arranged contact-pieces and a switch-arm 70, which turns with the rod 55 and bears upon said contact-pieces. The switch-arm is movable vertically upon an angular portion of the rod, and a spring 71 is arranged upon the rod above the arm in order to keep the latter pressed against the contact-points in all positions of the rod. This switching device is further illustrated in Fig. 9, its purpose being to vary the speeds of the armatures relatively to each other so that the wheels upon the opposite sides of the vehicle may be made to travel at different speeds for the purpose of steering.

The movement of the arm 60 in a vertical plane imparts movement in a vertical direction to the rod 55, which in turn moves the contact-piece upon the controller to increase or decrease the speeds of the armatures simultaneously. Indicator-marks 72 are arranged upon the curved faces of the side frames 59, and a pointer 73 upon the arm 60 indicates to the operator the position of the contact-piece upon the controller, so that he may readily obtain the desired speed by moving the handle to bring the pointer opposite the corresponding mark upon the scale. The vertical movement of the rod 55 is also utilized for the purpose of applying the brakes. As shown, the brakes are applied to the armature-shafts by means of a double brake-shoe 74, which is arranged beneath the brake-pulleys 75, said shoe being movable vertically in guideways 76. The shoe is connected by a suitable series of rods 77 and bell-crank levers 78 to a lever 79, pivoted upon the dashboard of the vehicle. This lever, as shown, is operated by means of an arc-shaped slide 80, connected by a pin 81 to the rod 55. The slide 80 is adapted to move up and down on the outside of the post and is formed with a horizontal groove 82, within which the end of the lever 79 extends. This arrangement permits the guide post and rod 55 to be turned without disengaging the lever 79 from the groove in the slide, and said lever may therefore be operated in all desired positions of the steering-post. When the handle 60 is lowered, the rod 55 is depressed and the contact-piece 67 is moved to the left, thereby cutting off the current from the armatures, and the slide 80 descends, thereby raising the outer end of the lever 79 and through the medium of the rods and bell-crank levers raising the brake-shoe 74 and applying the brakes after the current is cut off. As the armatures move at high speed and with small torque they may be stopped with a comparatively-light pressure of the brake-shoe upon the brake-wheels. When the handle 60 is raised, the brake-shoe drops away from the brake-wheels and the continued upward movement of the handle starts the motors.

In addition to the means shown for moving the half-axles 6 and 7 out of line with the casing 40 to steer the vehicle, as shown in Fig. 1, I also provide means whereby the operator may swing the casing bodily with respect to the carriage-body, as shown in Fig. 2, and means for locking said casing in the transverse position shown in Figs. 1 and 5. Ordinarily the steering of the forward part of the carriage is controlled by the movement of the half-axles relatively to the casing; but occasionally, where it may be desired to turn abruptly, as in narrow streets or alleys, the casing is turned bodily, as shown in Fig. 2. In order to turn the axle-casing, I provide a sleeve 85, which fits over the steering post of the casing, as shown. A hand-wheel 86 is rigidly secured to the sleeve 85, and by means of this hand-wheel the operator may turn the casing bodily in either direction. In order to lock the axle-casing in its normal position transversely to the body of the carriage, I provide a circular plate 87, having a central opening 88, through which the sleeve 85 extends, said plate being secured to the floor of the carriage. A notch 89 is formed at one side of the plate, and this slot is adapted to receive a latch 90, which is pivoted to a boss 91 upon the sleeve. The latch normally rests within the notch 89, thus locking the axle-casing in the transverse position. When, however, it is desired to swing the axle-casing, the latch is pulled out of the notch by means of a chain 92, connected with a lever 93, pivoted to the upper end of the sleeve. The outer end of the lever extends beneath the rim of the hand-wheel, so that the operator may grasp the hand-wheel and simultaneously raise the latch. The axle-casing may then be rotated by turning the wheel, and the latch will rest upon the top of the plate 87 until the axle-casing is brought back to its normal position, when the latch will drop back into the notch, thereby locking the parts. When the forward wheels are turned into the position indicated in Fig. 2, by rotating the axle-casing it will be seen that the power applied to the rear wheels will not be effective to move the vehicle. This situation usually arises when the vehicle has been brought to a stop in a narrow street or alley and it is desirable to turn around as shortly as possible. In order to extricate the carriage from this position and to make the short turn, I provide small auxiliary motors 94 and 95, which are mounted upon platforms 96, the latter being secured to extensions of the trunions 97. As shown in Fig. 8, the armature-shaft of each of these motors is arranged to operate a worm-gear 98, also mounted upon the platform, and the shafts 99 of the worm-gears are provided with sleeves 100, carrying pinions 101, which mesh with gears 102 upon the hubs of the wheels 4 and 5. The sleeves 100 are provided with clutch members 103, adapted to be engaged by complemental clutch members 104, which are splined to and movable along the shafts 99. Each clutch member 104 is operated by means of a clutch-lever 105, the latter being controlled by a ball-governor 106, mounted upon a shaft 107, said shaft being geared to the shaft 99 by means of suitable gear-wheels 108 and 109. The clutch members are normally held apart by the governor when the motors are not running, as shown at the left of Fig. 8. When, however, the armatures are set in motion, it will be seen that the governors will operate the levers 105, causing the latter to throw the clutch members into engagement, as shown at the right of Fig. 8, thereby causing the pinions 101 to rotate with the shaft 99 and to move the forward wheels of the vehicle. When it is desired to operate these auxiliary motors, they may be started and stopped by a suitable circuit-closing switch, arranged upon the vehicle in a position convenient to the operator. Normally the auxiliary motors are not in operation and the clutches are therefore disengaged, permitting the pinions 101 to turn idly when the carriage is driven by the rear motors. They may, however, be used to assist the driving-motors in ascending steep grades.

Figure 9:
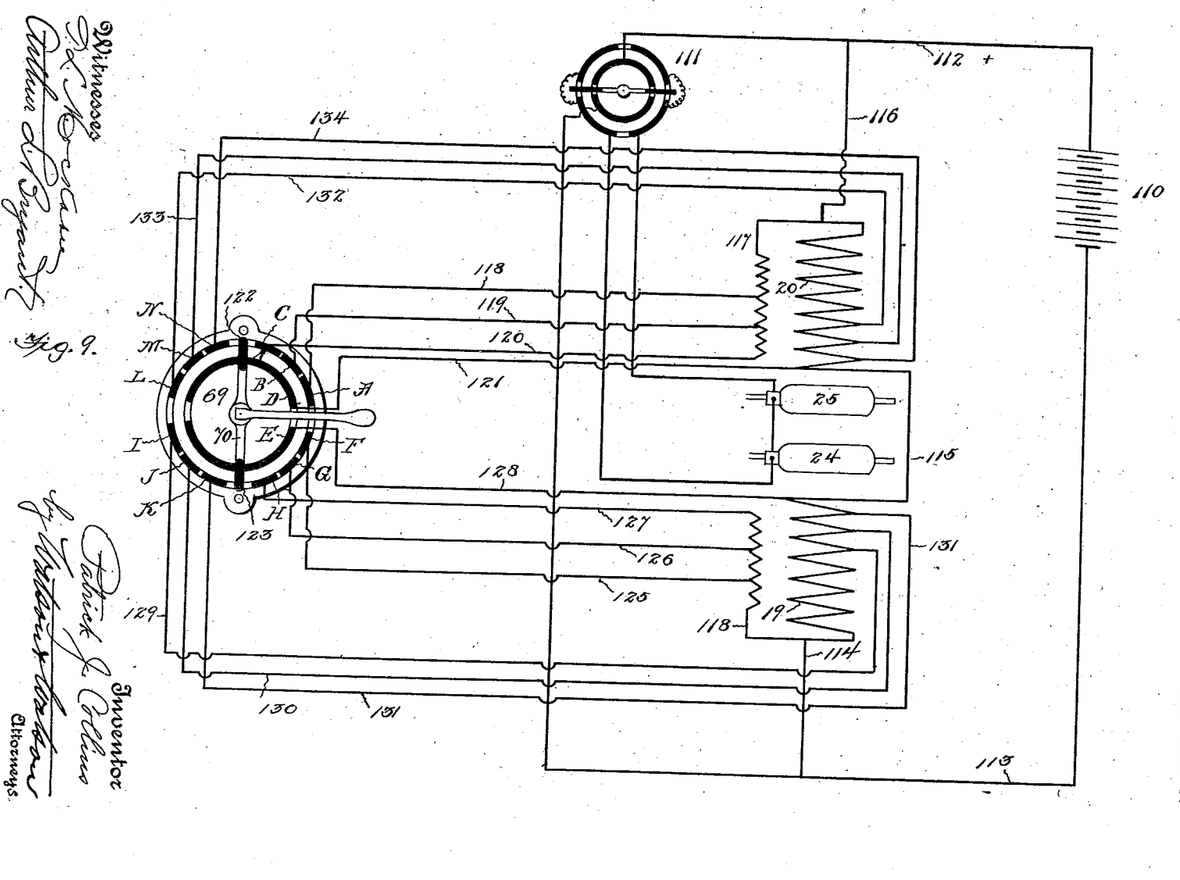
Fig. 9 is a diagram showing the arrangement of circuits by means of which the armatures of the motors are regulated in speed to steer the vehicle.

In Fig. 9 I have shown in diagram the arrangement of circuits by which the speeds of the armatures connected to the wheels upon opposite sides of the vehicle are varied relatively to each other for the purpose of steering. In this diagram I have shown the circuits arranged to vary the speeds of two armatures, although I may also connect the forward motors to the same steering-switch and effect the same control over said motors. In the diagram, 24 and 25 represent the armatures which are connected to the rear wheels, and 19 and 20 represent corresponding field-coils. The armatures, as shown, are connected in series with the battery 110 through a reversing-switch 111 and the mains 112 and 113. By means of the reversing-switch, which is arranged within the vehicle convenient to the operator, as shown in Fig. 6, the direction of rotation of the armatures may be controlled in the usual manner to drive the vehicle in either direction; and by means of the circuits connected with the steering-switch 69 the fields may be varied simultaneously, so that as the strength of one field is increased the strength of the other field will be correspondingly decreased, and vice versa, thereby inducing the desired relative changes in the speeds of the armatures. The fields, as shown in the drawings, are connected in series with each other, as indicated by circuits 114, 115, and 116. A resistance-coil 117 is connected at one end to the wire 116, and wires 118, 119, and 120 connect contact-points A, B, and C of the steering-switch 69 with different points of the resistance-coil. A wire 121 connects the semicircular contact-piece D with the wire 115, connected to the inner terminal of the field-coil 20. The switch-arm 70 is provided with suitable metallic ends 122 and 123, adapted to connect the inner semicircular contact-pieces D and E with the concentric contact-pieces. It will be seen that if the arm is moved from the central position shown onto the contact-piece C the entire resistance 117 will be thrown in shunt to the field 20 through the wires 121 and 120. This will weaken said field and cause the armature 25 to rotate faster than before. The continued movement of the arm will shunt the current through the contact-piece B and wire 119 and a portion of the resistance 117 will be cut out, thus still further weakening the field, and the movement of the arm onto the contact-piece A will cause the current to traverse the wire 118 and a still smaller section of the resistance, thus again weakening the field. The resistance 118 is connected in a similar way by wires 125, 126, and 127 to contact-points F, G, and H, respectively, and the inner terminal of the field is connected by a wire 128 to the semicircular contact-plate E. The movement of the end 23 of the arm, therefore, over said contact-points H, G, and F in succession will correspondingly weaken the field 19 and cause the armature 24 to rotate faster.

In order to strengthen one field and simultaneously weaken the other, I provide upon the switch a series of contact-pieces I, J, and K, which are arranged diametrically opposite to the contacts A, B, and C, respectively, and a similar series of contact-pieces L, M, and N, which are arranged, respectively, opposite to the contacts F, G, and H. The contacts I, J, and K are connected by wires 129, 130, and 131 to different points of the field-coil 19, and the contact-pieces L, M, and N are connected by wires 132, 133, and 134 to different points of the field-coil 20. When the arm 70 is turned into the position indicated in dotted lines, the bridge-piece 122 will connect the contact-pieces C and D and a portion of the current will be shunted around the field 20, weakening the latter in the manner previously described, and the field 19 will be strengthened by reason of the short-circuiting of the coils upon the field between the points of connection of the wire 131 and the wire 115, the current passing through said wire 131, contact-piece K, bridge-piece 123, contact E, and wire 128 to the wire 115. This short-circuiting of a section of the field 19 reduces the resistance of the field and permits a larger quantity of current to circulate in the remaining coils, thereby strengthening the field. It will be seen that the movement of the arm 70 onto the contact-piece J will short-circuit a greater portion of the field 19 through the wire 130 and that the still further movement will short-circuit a larger section of the field-coil through the wire 129, and the increased volume of current which is permitted to pass by reason of the reduction in resistance will increase the strength of the field 19. It will be clear without further description that the movement of the arm in the opposite direction will cause an increase in the strength of the field 20 and a corresponding decrease in the strength of the field 19 and that while the arm is in the central position (shown in full lines in the figure) the field strengths will remain alike. As the switch-arm 70 turns with the rod 55 a movement of the operating-lever 60 to the right will cause an increase in the speed of the armature 24 upon the left and a decrease in the speed of the armature 25 upon the right, and a movement of the lever to the left will cause an increase in the speed of the right-hand armature and a decrease in speed of the left-hand armature. When the lever is held in the central position, both armatures will turn at the same speed. The turning of the steering-post by the handle 60 to the right therefore turns the front wheels to guide the vehicle to the right, as indicated in Fig. 1, and also turns the arm of the steering-switch so as to increase the speed of the left-hand driving-wheel and to decrease the speed of the right-hand driving-wheel, and when the handle is turned to the left the front wheels are turned to guide the vehicle to the left, while the speed of the right-hand driving-wheel is simultaneously increased and that of the left-hand wheel is decreased, resulting in an easy turning of the vehicle by simply swinging the lever toward the side to which it is desired to move. The vertical movement of the handle governs the speed of the vehicle through the movement of the contact-piece upon the controller 68 and also applies and releases the brake.

The operation will be clear from the foregoing description.

By reason of the use of high-speed armatures within a single field-frame the weight and size of the motor are reduced to a minimum, and the weight of the battery to be carried may also be reduced owing to the fact that high-speed motors are, as a rule, more efficient than slow-speed machines.

Having described my invention, what I claim, and desire to secure by Letters Patent of the United States, is—

1. In an electrically-operated motor-vehicle, the combination with the fixed axle having a pair of independent driving-wheels journaled thereon, of a support suspended beneath the body of the vehicle and hinged at one end to said shaft, a pair of worm-wheels and independent shafts therefor mounted upon said support, said shafts being geared to the driving-wheels, independent armatures upon the support for operating said worm-wheels, and means for relatively varying the speeds of said armatures.

2. In an electrically-propelled motor-vehicle, the combination with a fixed axle having a pair of independent driving-wheels journaled thereon, of a support suspended beneath the body of the vehicle and hinged at one end to said shaft, a pair of worm-wheels and independent shafts therefor mounted upon said support, said shafts being geared to the driving-wheels, a motor upon said support, said motor having two independent armatures the shafts of which are arranged to operate the worm-wheels, and means for relatively varying the speeds of said armatures.

3. In a motor-vehicle, the combination with the body of an axle-casing by which said body is supported, said casing being movable relatively to the body, of a pair of wheels having their axles pivoted to the casing and movable relatively thereto, a steering-post for moving said axles, a sleeve fixed to the casing and surrounding the steering-post, said sleeve being adapted to turn the casing, and means for locking said sleeve to the body of the carriage.

4. In a motor-vehicle, the combination with the forward wheels mounted upon independent axles and a casing for said axles pivoted beneath the body of the vehicle, of motors arranged to operate said wheels, means for automatically connecting the motors operatively to the wheels when said motors are running and for disengaging the motors from the wheels when said motors are stopped.

5. In a motor-vehicle, the combination with a wheel journaled upon an axle, and a motor arranged to operate said wheel, of means for automatically connecting said motor to said wheel when the motor is in operation and for disconnecting said motor from said wheel when the motor stops.

6. In a motor-vehicle, the combination with a vehicle-wheel and a motor arranged to operate said wheel, of means for automatically disconnecting said motor from the wheel when the motor is stopped.

7. In a motor-vehicle, the combination with a vehicle-wheel and a motor arranged to operate said wheel, of means for automatically connecting said motor to said wheel after the motor is started into operation.

8. In a motor-vehicle, the combination with a vehicle-wheel, a motor adapted to operate said wheel and worm-gearing interposed between said motor and wheel, of means for automatically disconnecting said gearing from said wheel when the motor is stopped.

9. In a motor-vehicle the combination with the axle-casing supported by the axles of the forward wheels, of a body supported above said casing, a hand-wheel connected to said casing and adapted to move said casing relatively to the body, and motors arranged to operate the forward wheels.

10. The combination with the independently-driven rear wheels, of the forward wheels mounted upon independent axles, a casing for said axles pivoted beneath the body, and motors for operating said forward wheels.

11. In an electrically-propelled vehicle the combination with the independent axles having the forward wheels journaled thereon, and a casing within which said axles are pivoted, of a hollow steering-post arranged to swing said axles upon their pivots, a sleeve attached to the axle-casing and surrounding said steering-post, said sleeve being adapted to turn the casing, a handle pivoted at the upper end of said post, a rod extending through the post and connected to said handle, a controller operated by the vertical movement of said rod, and a steering-switch operated by the rotary movement of the rod.

12. In an electrically-propelled motor-vehicle the combination with the rear wheels and independent armatures arranged to operate the same, of the forward wheels mounted upon independent pivoted axles, a rotatable steering-post operatively connected with said axles, a steering-head upon said post, a vertically-movable handle connected to said steering-head, a rod extending through the post and connected with said handle, a controller operated by the vertical movement of said rod, and a steering-switch operated by the rotary movement of said rod and adapted to vary the speeds of said armatures relatively to each other.

13. In an electrically-propelled motor-vehicle, the combination with the rear wheels and independent armatures arranged to operate the same, of the forward wheels mounted upon independent axles, a rotatable steering-post operatively connected with said axles, a vertically-movable handle upon said post, a rod extending through the post and connected with said handle, a controller and brake-shoe operated by the vertical movement of said rod, and a steering-switch operated by the rotary movement of said rod and adapted to vary the speed of said armatures relatively to each other.

14. In an electrically-propelled vehicle the combination with the forward wheels mounted upon pivoted axles, and a steering-post arranged to turn said axles about their pivotal points to steer the vehicle, of the rear wheels journaled upon a fixed axle, an armature geared to each rear wheel, field-windings for each armature, and a suitably-connected steering-switch arranged to be operated by the movement of the steering-post to vary the speeds of said armatures relatively to each other when said steering-post is moved to turn the forward axles.

15. In an electrically-propelled motor-vehicle, the combination with the rear wheels and independent armatures arranged to operate the same, of the forward wheels mounted upon independent pivoted axles, a rotatable steering-post arranged to turn said axles about their pivotal points, a vertically-movable handle connected to said post, a controller and brake-shoe operated by the vertical movement of the handle, and a switch operated by the rotary movement of the post to vary the speeds of the armatures relatively to each other.

16. In an electrically-propelled motor-vehicle, the combination with the rear wheels, and independent armatures arranged to operate the same, of the forward wheels mounted upon independent pivoted axles, a rotatable steering-post arranged to turn said axles about their pivotal points, a vertically-movable handle connected to said post, a controller operated by the vertical movement of the handle, and a switch operated by the rotary movement of the post to vary the speeds of the armatures relatively to each other.

In testimony whereof I affix my signature in presence of two witnesses.

PATRICK J. COLLINS.

Witnesses:
ROBERT WATSON,
M. F. SANDS.